US011597825B2

(12) United States Patent
Taki

(10) Patent No.: US 11,597,825 B2
(45) Date of Patent: Mar. 7, 2023

(54) RESIN COMPOSITION, SHEATH CABLE, AND WIRE HARNESS

(71) Applicant: Yazaki Corporation, Tokyo (JP)

(72) Inventor: Akihiro Taki, Shizuoka (JP)

(73) Assignee: YAZAKI CORPORATION, Minato-ku (JP)

( * ) Notice: Subject to any disclaimer, the term of this patent is extended or adjusted under 35 U.S.C. 154(b) by 14 days.

(21) Appl. No.: 17/245,399

(22) Filed: Apr. 30, 2021

(65) Prior Publication Data
US 2021/0340364 A1   Nov. 4, 2021

(30) Foreign Application Priority Data
May 1, 2020 (JP) .............................. JP2020-080919

(51) Int. Cl.
C08L 33/12 (2006.01)
C08L 23/08 (2006.01)
C08F 220/18 (2006.01)
C08F 220/14 (2006.01)
C08K 3/22 (2006.01)
C08K 5/03 (2006.01)
C08L 23/16 (2006.01)
H01B 3/44 (2006.01)

(52) U.S. Cl.
CPC ........ *C08L 23/0869* (2013.01); *C08F 220/14* (2013.01); *C08F 220/1802* (2020.02); *C08K 3/2279* (2013.01); *C08K 5/03* (2013.01); *C08L 23/16* (2013.01); *H01B 3/441* (2013.01); *H01B 3/447* (2013.01); *C08L 2203/202* (2013.01)

(58) Field of Classification Search
CPC ...... C08L 33/08; C08L 33/10; C08L 23/0869; C08F 220/00; C08F 220/14; C08F 220/18; C08F 220/02; C08F 220/1802
See application file for complete search history.

(56) References Cited

U.S. PATENT DOCUMENTS

| | | | |
|---|---|---|---|
| 2008/0053696 | A1 | 3/2008 | Nakayama et al. |
| 2014/0367141 | A1 | 12/2014 | Tozawa et al. |
| 2015/0380127 | A1 | 12/2015 | Tanigawa |
| 2016/0307669 | A1 | 10/2016 | Tozawa et al. |
| 2020/0207958 | A1 | 7/2020 | Taki |
| 2020/0299493 | A1 | 9/2020 | Taki |

FOREIGN PATENT DOCUMENTS

| | | |
|---|---|---|
| CN | 101080457 A | 11/2007 |
| CN | 103012940 A | 4/2013 |
| CN | 105143338 A | 12/2015 |
| CN | 111499959 A | 8/2020 |
| CN | 111718532 A | 9/2020 |
| EP | 3 675 140 A1 | 7/2020 |
| JP | 61-183335 A | 8/1986 |
| JP | 2001345022 A | 12/2001 |
| JP | 2008-084833 A | 4/2008 |
| JP | 2015-40235 A | 3/2015 |
| JP | 2016110774 A | 6/2016 |
| JP | 2016-173991 A | 9/2016 |
| JP | 2017135931 A | 8/2017 |
| JP | 2020-187928 A | 11/2020 |

*Primary Examiner* — Irina S Zemel
*Assistant Examiner* — Jeffrey S Lenihan
(74) *Attorney, Agent, or Firm* — Sughrue Mion, PLLC

(57) ABSTRACT

A resin composition includes a resin component including an ethylene-(meth)acrylate copolymer and at least either an ethylene-propylene-diene terpolymer or ethylene acrylate rubber. A content of the ethylene-(meth)acrylate copolymer with respect to a total content of the ethylene-(meth)acrylate copolymer and at least either the ethylene-propylene-diene terpolymer or the ethylene acrylate rubber is 35% by mass or greater and 90% by mass or less. A tensile stress at 19% strain of the resin composition is 2.0 MPa or less, and a tensile stress at break of the resin composition is 10.3 MPa or greater.

11 Claims, 1 Drawing Sheet

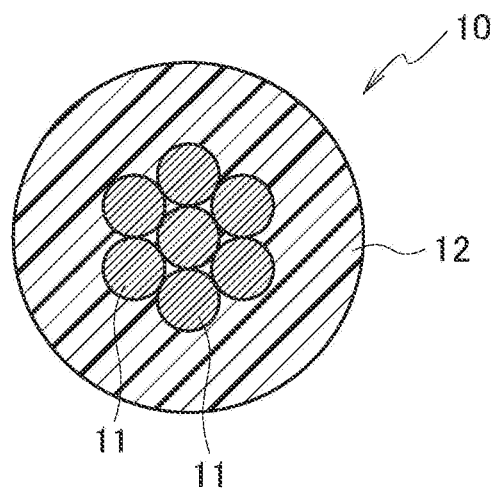

RESIN COMPOSITION, SHEATH CABLE, AND WIRE HARNESS

CROSS-REFERENCE TO RELATED APPLICATIONS

The present application is based on, and claims priority from Japanese Patent Application No. 2020-080919, filed on May 1, 2020, the entire contents of which are incorporated herein by reference.

TECHNICAL FIELD

The present disclosure relates to a resin composition, a sheath cable, and a wire harness.

BACKGROUND

The demand for an increase in battery capacity has grown so as to increase traveling distances of electric vehicles. To avoid an increase in charging time in association with the increase in the battery capacity, a diameter of a conductor of a cable as a component of a wire harness needs to be increased. Since a volume of the battery is increased as the battery capacity is increased, the space occupied by a battery pack in the vehicle tends to be increased. The cable thus should be designed so as to be flexibly bent and routed in a narrow and short path.

A silicone rubber cable including a conductor that is insulated and covered with flexible silicone rubber is typically used in a narrow and short path. The silicone rubber is relatively expensive as compared with typically-used insulating material such as polyvinyl chloride, polypropylene, and polyethylene. In addition, a specific device needs to be additionally used to manufacture the silicone rubber cable, such as a hot air device for vulcanization after covering the conductor with the silicone rubber by extrusion molding, as compared with a method of manufacturing the insulating material typically used. Actual practical usage situations do not always need to use a component, such as the silicone rubber cable, that is required to have a high heat-resistance level (200° C.×10,000 hours). Instead, various kinds of cables other than the silicone rubber cable are disclosed.

JP 2008-84833A discloses a flexible non-halogen cable in which a conductor including a plurality of wires twisted is covered with an insulator. The wires have a diameter of 0.12 mm to 0.31 mm. The insulator is obtained such that resin component material and metal hydroxide are mixed to form a sheath material, and the conductor is covered with the sheath material and then cross-linked to form a cross-linked resin composition. The resin composition material is obtained such that an ethylene copolymer as a main component containing oxygen in a molecular structure and including 25% to 40% by weight of a vinyl monomer other than vinyl acetate is mixed together with an elastomer as a subcomponent.

JP2016-173991 A discloses an electric cable including a conductor composed of a plurality of wires having a diameter of 0.15 mm or greater and 0.5 mm or smaller, the conductor being covered at the circumference with insulating resin containing a flame retardant. The insulating resin includes a copolymer A of olefin and a comonomer having a polarity, or includes a mixture of the copolymer A and copolymer B of olefin and an α-olefin. A ratio of the diameter of the electric cable to the diameter of the conductor is 1.15 or greater and 1.40 or less, and a secant modulus thereof in which the insulating resin is cross-linked is 10 MPa or greater and 50 MPa or less.

SUMMARY

The flexibility of each of the flexible non-halogen wire disclosed in JP 2008-84833 A and the electric cable disclosed in JP 2016-173991 A is not sufficiently high as compared with silicone rubber. The flexibility can be increased as the thickness of the covered layer is decreased and as the diameter of the wires of the conductor is decreased. However, the decrease in the diameter of the wires is not practical in view of the manufacturing costs. In addition, the cover layer of the cable also needs to have strength and heat resistance in addition to the flexibility.

To solve the conventional problems as described above, the present disclosure provides a resin composition having flexibility, strength, and heat resistance sufficient to be used for a cover layer of a cable, and a sheath cable and a wire harness using the resin composition.

A resin composition according to an aspect of the present disclosure includes a resin component including an ethylene-(meth)acrylate copolymer and at least either an ethylene-propylene-diene terpolymer or ethylene acrylate rubber. A content of the ethylene-(meth)acrylate copolymer with respect to a total content of the ethylene-(meth)acrylate copolymer and at least either the ethylene-propylene-diene terpolymer or the ethylene acrylate rubber is 35% by mass or greater and 90% by mass or less. A tensile stress at 19% strain of the resin composition is 2.0 MPa or less, and a tensile stress at break of the resin composition is 10.3 MPa or greater.

A content of (meth)acrylate included in the ethylene-(meth)acrylate copolymer may be 24% by mass or greater.

A tensile stress at break of the ethylene-(meth)acrylate copolymer may be 9 MPa or greater, and a flexural modulus of the ethylene-(meth)acrylate copolymer may be 15 MPa or less.

The resin composition may further include a flame retardant of 80 parts by mass or less with respect to 100 parts by mass of the resin component.

The resin composition may have heat resistance of 150° C. prescribed in JASO D624.

The content of the ethylene-(meth)acrylate copolymer with respect to the total content of the ethylene-(meth)acrylate copolymer and at least either the ethylene-propylene-diene terpolymer or the ethylene acrylate rubber may be 40% by mass or greater and 80% by mass or less.

A ratio of a weight average molecular weight to a number average molecular weight of the ethylene-(meth)acrylate copolymer may be five or smaller.

A content of (meth)acrylate included in the ethylene-(meth)acrylate copolymer may be 28% by mass or greater and less than 30% by mass, the content of the ethylene-(meth)acrylate copolymer with respect to the total content of the ethylene-(meth)acrylate copolymer and at least either the ethylene-propylene-diene terpolymer or the ethylene acrylate rubber may be 35% by mass or greater and 80% by mass or less, and a ratio of a weight average molecular weight to a number average molecular weight of the ethylene-(meth) acrylate copolymer may be one or greater and five or less.

A sheath cable according to another aspect of the present disclosure includes a conductor, and a cover layer covering the conductor and including a resin component.

A wire harness according to still another aspect of the present disclosure includes a sheath cable.

The present disclosure can provide the resin composition having flexibility, strength, and heat resistance sufficient to be used for the cover layer of the cable, and the sheath cable and the wire harness using the resin composition.

BRIEF DESCRIPTION OF THE DRAWINGS

The FIGURE is a schematic cross-sectional view showing an example of a sheath cable according to the present embodiment.

DETAILED DESCRIPTION

A resin composition, a sheath cable, and a wire harness according to the present embodiment are described in detail below with reference to the drawing. The dimensional ratios of the elements in the drawing are exaggerated for illustration purposes, and are not necessarily drawn to scale.

[Resin Composition]

A resin composition included in a cover layer of a sheath cable is required to have high flexibility. It was found out through analysis that the sheath cable has sufficient flexibility in practical use when, for example, a tensile stress at 19% a strain of the resin composition is set to a predetermined value or smaller while taking account of a radius of the sheath cable and a case in which the sheath cable is bent with a predetermined curvature. The resin composition according to the present embodiment is thus configured to have the tensile stress at 19% strain set to 2.0 MPa or less. Setting the tensile stress at 19% strain of the resin composition to 2.0 MPa or less can improve the flexibility of the resin composition. The tensile stress at 19% strain is preferably 1.5 MPa or less so as to approximate to the flexibility of silicone rubber. Since the flexibility is higher as the tensile stress at 19% strain is smaller, the tensile stress at 19% strain may be set to 0.1 MPa or greater, while the lower limit of the tensile stress at 19% strain may be determined as appropriate. The tensile stress at 19% strain can be measured in accordance with JIS K7161-1:2014 (Plastics-Determination of tensile properties-Part 1: General principles).

The resin composition preferably has type A durometer hardness of 75 or less. Setting the type A durometer hardness of the resin composition to 75 or less can reduce the flexibility of the resin composition. The type A durometer hardness can be measured in accordance with JIS K7215:1986 (Testing Methods for Durometer Hardness of Plastics).

The resin composition included in the cover layer of the sheath cable is also required to have high hardness. A tensile stress at break of the resin composition is set to 10.3 MPa or greater. Setting the tensile stress at break of the resin composition to 10.3 MPa or greater can ensure sufficient strength when the resin composition is used for the cover layer of the sheath cable. Since the strength of the resin composition is higher as the tensile stress at break is greater, the tensile stress at break may be set to 25 MPa or less, or may be set to 20 MPa or less, while the upper limit of the tensile stress at break may be determined as appropriate. The tensile stress at break can be measured in accordance with JIS K7161-1:2014.

The resin composition included in the cover layer of the sheath cable is further required to have long-term heat resistance. The resin composition preferably has heat resistance of 150° C. prescribed in the Japanese Automotive Standards Organization JASO D624. In particular, an elongation rate of the resin composition when heated at 150° C. for 10,000 hours is preferably 100% or lower. The resin composition having the heat resistance as described above can be used for the cover layer of the sheath cable under a high-temperature environment including a situation used in an automobile.

(Resin Component)

The resin composition includes a resin component. The resin component includes an ethylene-(meth)acrylate copolymer, and at least either an ethylene-propylene-diene terpolymer (EPDM) or ethylene acrylate rubber (AEM). As used herein, (meth)acrylate refers to at least either acrylate or methacrylate.

(Ethylene-(Meth)Acrylate Copolymer)

The ethylene-(meth)acrylate copolymer is a copolymer obtained by polymerizing a monomer component containing ethylene and (meth)acrylate. The ethylene-(meth)acrylate copolymer can be obtained such that the monomer component containing ethylene and (meth)acrylate is polymerized.

The ethylene-(meth)acrylate copolymer can be obtained by a known polymerization reaction, and may be polymerized by tubular polymerization with a tubular polymerization reactor, or may be polymerized by autoclave polymerization with an autoclave polymerization reactor. To improve the tensile stress at 19% strain, the ethylene-(meth)acrylate copolymer is preferably polymerized by the tubular polymerization.

A number average molecular weight Mn of the ethylene-(meth)acrylate copolymer may be 14,000 or greater, 15,000 or greater, 16,000 or greater, or 17,000 or greater, for example. The number average molecular weight Mn of the ethylene-(meth)acrylate copolymer may be 22,000 or less, 21,000 or less, or 20,000 or less, for example.

A weight average molecular weight Mw of the ethylene-(meth)acrylate copolymer may be 50,000 or greater, 60,000 or greater, or 70,000 or greater, for example. The weight average molecular weight Mw of the ethylene-(meth)acrylate copolymer may be 120,000 or less, 110,000 or less, 100,000 or less, or 90,000 or less, for example.

A ratio of Mw to Mn (Mw/Mn) of the ethylene-(meth)acrylate copolymer is preferably one or greater and six or smaller. Setting the ratio Mw/Mn to this range can improve the tensile stress at break and the flexibility of the ethylene-(meth)acrylate copolymer. The ratio Mw/Mn may be two or greater, or three or greater. The ratio Mw/Mn may be five or smaller.

The (meth)acrylate includes at least one (meth)acrylate selected from the group consisting of methyl (meth)acrylate, ethyl (meth)acrylate, butyl (meth)acrylate, and 2-ethylhexyl (meth)acrylate, for example.

Specific examples of the ethylene-(meth)acrylate copolymer include, but not limited to, an ethylene-methyl methacrylate copolymer (EMMA), an ethylene-methyl acrylate copolymer (EMA), an ethylene-ethyl acrylate copolymer (EEA), and an ethylene-butyl acrylate copolymer (EBA). These ethylene-(meth)acrylate copolymers may be used independently, or two or more thereof may be used in combination. The ethylene-(meth)acrylate copolymer may be, but not necessarily, modified with maleic acid and maleic anhydride, for example. To ensure the heat resistance, the ethylene-(meth)acrylate copolymer is preferably at least one selected from the group consisting of the ethylene-methyl acrylate copolymer (EMA), the ethylene-ethyl acrylate copolymer (EEA), and the ethylene-butyl acrylate copolymer (EBA). To further improve the heat resistance, the ethylene-(meth)acrylate copolymer is more preferably at least either the ethylene-methyl acrylate copolymer (EMA) or the ethylene-ethyl acrylate copolymer (EEA).

The ethylene-(meth)acrylate copolymer may include a small amount of a monomer component other than ethylene and (meth)acrylate. The total content of ethylene and (meth) acrylate included in the ethylene-(meth)acrylate copolymer is preferably 80/s by mass or greater, and more preferably 90% by mass or greater. The total content of ethylene and (meth)acrylate included in the ethylene-(meth)acrylate copolymer is still more preferably 95% by mass or greater.

The content of (meth)acrylate included in the ethylene-(meth)acrylate copolymer is preferably 24% by mass or greater. Setting the content of (meth)acrylate to 24% by mass or greater can still exhibit the flexibility with a smaller added amount of the ethylene-propylene-diene terpolymer and the ethylene acrylate rubber, decreasing an added amount of an additive sufficient to ensure the intended heat resistance accordingly. Since the added amount of the ethylene-propylene-diene terpolymer and the ethylene acrylate rubber can be decreased, moldability of the sheath cable can be improved. The content of (meth)acrylate included in the ethylene-(meth)acrylate copolymer is more preferably set to 28% by mass or greater. The content of (meth)acrylate included in the ethylene-(meth)acrylate copolymer may be set to 40% by mass or less, or 35% by mass or less, while the upper limit of the content of (meth)acrylate may be determined as appropriate.

The content of ethylene included in the ethylene-(meth) acrylate copolymer is preferably, but not necessarily, set to 55% by mass or greater and 75% by mass or less, and more preferably 65% by mass or greater and 72% by mass or less. Setting the content of the ethylene included in the ethylene-(meth)acrylate copolymer to this range can improve the mechanical characteristics of the sheath cable as described below.

A flexural modulus (a flexural modulus of elasticity) of the ethylene-(meth)acrylate copolymer may be 15 MPa or less. The use of the ethylene-(meth)acrylate copolymer having this flexural modulus can increase the probability of improving the flexibility of the resin composition. The tensile stress at break of the ethylene-(meth)acrylate copolymer may be 9 MPa or greater. The flexural modulus of the ethylene-(meth)acrylate copolymer can be measured in accordance with ISO 178, ASTM D790, or JIS K7171: 2016. The tensile stress at break can be measured in accordance with JIS K7161-1:2014.

(Ethylene-Propylene-Diene Terpolymer)

The ethylene-propylene-diene terpolymer (EPDM) is a rubbery copolymer of ethylene, propylene, and diene. The physical properties of the ethylene-propylene-diene terpolymer are controlled mainly in accordance with the amount of ethylene and the amount of diene. The hardness is lower (softer) as the amount of ethylene is smaller, and the permanent compressive strain is smaller as the amount of diene is larger. The content of ethylene included in the ethylene-propylene-diene terpolymer is preferably, but not necessarily, set to 70% by mass or less in view of the improvement in the flexibility. The content of diene included in the ethylene-propylene-diene terpolymer is preferably, but not necessarily, set to 7% by mass or less in view of the improvement in the heat resistance. The content of diene set to 7% by mass or less as described above is also referred to as the amount of medium diene.

The ethylene-propylene-diene terpolymer may include oil such as mineral oil, paraffin oil, and naphthenic oil. Mooney viscosity of the ethylene-propylene-diene terpolymer is preferably 60 ML (1+4) 125° C. or less, where 60 M refers to the Mooney viscosity, L indicates that a rotor has an L-shape, (1+4) refers to a preheating time that is one minute and a rotating time of the rotor that is four minutes, and 125° C. is a test temperature. The Mooney viscosity can be measured in accordance with JIS K6300-1: 2013 (Rubber, unvulcanized-physical property-Part 1: Determination of Mooney viscosity and pre-vulcanization characteristics with Mooney viscometer).

(Ethylene Acrylate Rubber)

The ethylene acrylate rubber (AEM) is a rubbery copolymer of ethyl acrylate or another acrylate and ethylene. Shore A hardness of at least either the ethylene-propylene-diene terpolymer or the ethylene acrylate rubber is preferably, but not necessarily, set to 70 or less in view of the flexibility.

The resin component may include resin other than the ethylene-(meth)acrylate copolymer, the ethylene-propylene-diene terpolymer, and the ethylene acrylate rubber. The resin component may include polyolefin, for example. The polyolefin is a polymer of monomers containing olefin. The polyolefin may be a copolymer of a olefin and olefin other than the α olefin. The α-olefin may be at least one monomer selected from the group consisting of ethylene, propylene, 1-butene, 1-pentene, 1-hexene, 4-methyl-1-pentene, 1-octene, and 1-decene. The polyolefin may be at least one resin selected from the group consisting of high-density polyethylene (HDPE), low-density polyethylene (LDPE), linear low-density polyethylene (LLDPE), polypropylene (PP), and an ethylene-propylene block copolymer (EPBC).

The content of the resin component in the resin composition may be 50% by mass or greater, or 60% by mass or greater. The content of the resin component in the resin composition may be 90% by mass or less, 80% by mass or less, or 70% by mass or less.

The total content of the ethylene-(meth)acrylate copolymer, the ethylene-propylene-diene terpolymer, and the ethylene acrylate rubber in the resin component may be 80% by mass or greater, or 90% by mass or greater.

The content of the ethylene-(meth)acrylate copolymer with respect to the total content of the ethylene-(meth) acrylate copolymer and at least either the ethylene-propylene-diene terpolymer or the ethylene acrylate rubber is 35% by mass or greater and 90% by mass or less. Setting the content of the ethylene-(meth)acrylate copolymer to 35% by mass or greater can improve the heat resistance of the resin composition, and can further avoid a deformation of an extrusion-molded product when the resin composition is extrusion-molded to manufacture the sheath cable. The content of the ethylene-(meth)acrylate copolymer is preferably set to 40% by mass or greater. Setting the content of the ethylene-(meth)acrylate copolymer to 90% by mass or less can improve the flexibility and/or the strength. The content of the ethylene-(meth)acrylate copolymer is preferably set to 80% by mass or less. Namely, the content of the ethylene-(meth)acrylate copolymer with respect to the total content of the ethylene-(meth)acrylate copolymer and at least either the ethylene-propylene-diene terpolymer or the ethylene acrylate rubber is preferably 40% by mass or greater and 80% by mass or less. The content of the ethylene-(meth)acrylate copolymer with respect to the total content of the ethylene-(meth)acrylate copolymer and at least either the ethylene-propylene-diene terpolymer or the ethylene acrylate rubber is more preferably 70% by mass or less.

The content of the (meth)acrylate in the ethylene-(meth) acrylate copolymer is preferably 24% by mass or greater and 26% by mass or less, and the content of the ethylene-(meth) acrylate copolymer with respect to the total content of the ethylene-(meth)acrylate copolymer and at least either the ethylene-propylene-diene terpolymer or the ethylene acrylate rubber is preferably 35% by mass or greater and 60% by mass or less.

The content of the (meth)acrylate in the ethylene-(meth) acrylate copolymer is preferably 28% by mass or greater and less than 30% by mass, the content of the ethylene-(meth) acrylate copolymer with respect to the total content of the ethylene-(meth)acrylate copolymer and at least either the ethylene-propylene-diene terpolymer or the ethylene acrylate rubber is preferably 71% by mass or greater and 90% by mass or less, and the ratio Mw/Mn of the ethylene-(meth) acrylate copolymer is preferably 5 or greater and 10 or less. The content of the ethylene-(meth)acrylate copolymer with respect to the total content of the ethylene-(meth)acrylate copolymer and at least either the ethylene-propylene-diene terpolymer or the ethylene acrylate rubber in this case may be 75% by mass or greater, or may be 85% by mass or less. The ratio Mw/Mn of the ethylene-(meth)acrylate copolymer may be six or greater. The ratio Mw/Mn of the ethylene-(meth)acrylate copolymer may be nine or less, or eight or less.

The content of the (meth)acrylate in the ethylene-(meth) acrylate copolymer is preferably 28% by mass or greater and less than 30% by mass, the content of the ethylene-(meth) acrylate copolymer with respect to the total content of the ethylene-meth)acrylate copolymer and at least either the ethylene-propylene-diene terpolymer or the ethylene acrylate rubber is preferably 35% by mass or greater and 80% by mass or less, and the ratio Mw/Mn of the ethylene-(meth) acrylate copolymer is preferably one or greater and six or less. The content of the ethylene-(meth)acrylate copolymer with respect to the total content of the ethylene-(meth) acrylate copolymer and at least either the ethylene-propylene-diene terpolymer or the ethylene acrylate rubber in this case may be 40% by mass or greater. The ratio Mw/Mn of the ethylene-(meth)acrylate copolymer may be two or greater, or three or greater. The ratio Mw/Mn of the ethylene-(meth)acrylate copolymer may be five or less.

(Flame Retardant)

The resin composition may include a flame retardant in order to improve flame retardant properties. The resin composition preferably includes the flame retardant of 80 parts by mass or less with respect to 100 parts by mass of the resin component. Setting the content of the flame retardant to less than 80 parts by mass can improve the flexibility of the resin composition. The content of the flame retardant is preferably 50 parts by mass or less, and more preferably 40 parts by mass or less when the content of the resin component is 100 parts by mass in view of the flexibility. The content of the flame retardant is preferably 20 parts by mass or greater, more preferably 25 parts by mass or greater, and still more preferably 30 parts by mass or greater when the content of the resin component is 100 parts by mass in view of the flame retardant properties.

The flame retardant may be any type that can impart the flame retardant properties to the resin composition. The flame retardant may include at least either an organic flame retardant or an inorganic flame retardant, for example. The organic flame retardant may include at least one or more flame retardants selected from the group consisting of a halogen flame retardant, a phosphorus flame retardant, and a nitrogen flame retardant, for example. The inorganic flame retardant may include at least either a metal hydroxide or an antimony flame retardant, for example. The metal hydroxide may include at least either magnesium hydroxide or aluminum hydroxide, for example. The antimony flame retardant may include antimony trioxide, for example.

The halogen flame retardant can capture hydroxyl radicals that promote the combustion of thermoplastic resin, and suppress the combustion of the resin composition. The halogen flame retardant may be a compound in which at least one or more halogens are replaced by an organic compound, for example. The halogen flame retardant may include at least one or more flame retardants selected from the group consisting of a fluorine flame retardant, a chlorinated flame retardant, a brominated flame retardant, and an iodinated flame retardant, for example. The halogen flame retardant is preferably a brominated flame retardant or a chlorinated flame retardant, and more preferably a brominated flame retardant.

The chlorinated flame retardant may include at least one flame retardant selected from the group consisting of chlorinated polyethylene, chlorinated paraffin, and perchlorocyclopentadecane, for example.

The brominated flame retardant may include, for example, at least one flame retardant selected from the group consisting of, for example, 1,2-bis(bromophenyl) ethane, 1,2-bis(pentabromophenyl) ethane, hexabromobenzene, ethylenebis-dibromonorbornane dicarboximide, ethylenebis-tetrabromophthalimide, tetrabromobisphenol S, tris(2,3-dibromopropyl-1) isocyanurate, hexabromocyclododecane (HBCD), octabromophenyl ether, tetrabromobisphenol A (TBA), a TBA epoxy oligomer or polymer, TBA-bis(2,3-dibromopropyl ether), decabromodiphenyl oxide, polydibromophenylene oxide, bis(tribromophenoxy) ethane, ethylenebis(pentabromophenyl), dibromoethyl-dibromocyclohexane, dibromoneopentyl glycol, tribromophenol, tribromophenol allyl ether, tetradecabromodiphenoxybenzene, 2,2-bis(4-hydroxy-3,5-dibromophenyl) propane, 2,2-bis(4-hydroxyethoxy-3,5-dibromophenyl) propane, pentabromophenol, pentabromotoluene, pentabromodiphenyl oxide, hexabromodiphenyl ether, octabromodiphenyl ether, decabromodiphenyl ether, octabromodiphenyl oxide, dibromoneopentylglycol tetracarbonate, bis(tribromophenyl) fumaramide, and N-methylhexabromophenylamine.

The phosphorus flame retardant may include at least one or more flame retardants selected from the group consisting of phosphate ester, condensed phosphate ester, a cyclic phosphorus compound, and red phosphorus, for example.

The nitrogen flame retardant may include at least either a guanyl urea flame retardant such as guanyl urea phosphate or a melamine compound such as melamine cyanurate, for example.

The flame retardant preferably includes a brominated flame retardant and an antimony flame retardant, and more preferably includes ethylene bis(pentabromophenyl) and antimony trioxide. Using the flame retardants as described above in the resin composition according to the present embodiment can improve the flame retardant properties with a small content.

The content of the brominated flame retardant with respect to the total content of the flame retardants is preferably set in a range of 50% by mass to 80% by mass, and more preferably in a range of 60% by mass to 70% by mass. The content of the antimony flame retardant with respect to the total content of the flame retardants is preferably set in a range of 20% by mass to 50% by mass, and more preferably in a range of 30% by mass to 40% by mass. A ratio of the brominated flame retardant to the antimony flame retardant (the brominated flame retardant/the antimony flame retardant) is preferably set in a range of one to four, and more preferably in a range of 3/2 to 7/3.

In a case in which the resin composition of the present embodiment further includes an additive, the content of the additive is preferably 25 parts by mass or less when the content of the resin component is 100 parts by mass. Setting the content of the additive to 25 parts by mass or less can improve the flexibility of the resin composition.

The content of the flame retardant and the additive other than the flame retardant in the resin composition of the present embodiment is preferably less than 70 parts by mass when the content of the resin component is 100 parts by mass. Setting the content of the flame retardant and the additive other than the flame retardant to be less than 70 parts by mass can improve the flexibility of the resin composition. The content of the flame retardant and the additive other than the flame retardant in the resin composition of the present embodiment is more preferably less than 60 parts by mass when the content of the resin component is 100 parts by mass.

Examples of additives include a cross-linking agent, a cross-linking auxiliary agent, an antioxidant, a processing auxiliary agent, a plasticizer, a metal deactivator, filler, a reinforcing agent, a UV absorber, a stabilizer, a pigment, a dye, a coloring agent, an antistatic agent, and a foaming agent.

Examples of antioxidants include a phenolic antioxidant, a phosphorus antioxidant, and a sulfur antioxidant.

Examples of processing auxiliary agents include petroleum oil such as paraffinic oil and naphthenic oil added to rubber material.

The resin composition is produced such that the resin component described above is melt-kneaded, which can be made by a known method. For example, the resin composition can be obtained by pre-blending with a high-speed mixing device such as a Henschel mixer, and kneading with a known kneader such as a Banbury mixer, a kneader, and a roll mill.

The resin component in the present embodiment may be cross-linked. Cross-linking the ethylene-(meth)acrylate copolymer, the ethylene-propylene-diene terpolymer, and the ethylene acrylate rubber can improve the heat resistance of the resin composition. While a cross-linking method for the resin component may be determined as appropriate, the resin component may be subjected to radiation to be cross-linked, or the resin component may be cross-linked with a cross-linking agent included in the resin composition. The resin component is preferably cross-linked by radiation.

The radiation used for the cross-linking may be y rays or electron beams, for example. Subjecting the cover layer to radiation generates radicals in the molecules to form cross-linking bonds between the respective molecules.

The cross-linking agent used herein may be an organic peroxide, for example. The cross-linking agent may be at least one selected from the group consisting of, for example, dicumyl peroxide, di-tert-butyl peroxide, 2,5-dimethyl-2,5-di-(tert-butylperoxy) hexane, 2,5-dimethyl-2,5-di-(tert-butylperoxy) hexyne-3, 1,3-bis(tert-butylperoxyisopropyl) benzene, 1,1-bis(tert-butylperoxy)-3,3,5-trimethylcyclohexane, n-butyl-4,4-bis(tert-butylperoxy)valerate, benzoyl peroxide, 2,4-dichlorobenzoyl peroxide, tert-butylperoxybenzoate, tert-butylperoxyisopropyl carbonate, diacetyl peroxide, lauroyl peroxide, and tert-butylcumyl peroxide. The cross-linking agent may be used independently, or two or more thereof may be used in combination. The content of the cross-linking agent in the resin composition is preferably set in a range of 0.05 parts by mass to 0.10 parts by mass with respect to 100 parts by mass of the resin component.

The resin composition may include a cross-linking auxiliary agent in addition to the cross-linking agent so as to improve the cross-linking efficiency. A polyfunctional compound can be used as the cross-linking auxiliary agent. The cross-linking auxiliary agent may be at least one compound selected from the group consisting of an acrylate compound, a methacrylate compound, an allyl compound, and a vinyl compound, for example. These polyfunctional compounds may be used independently, or may be used in combination. The compound to be used is preferably trimethylolpropane trimethacrylate due to a high affinity for the resin component.

The content of the cross-linking auxiliary agent in the resin composition is preferably set in a range of 0.1 parts by mass to 5 parts by mass, and more preferably in a range of 0.8 parts by mass to 2 parts by mass with respect to 100 parts by mass of the resin component. Setting the content of the cross-linking auxiliary agent to the above range can improve the heat resistance, processability, and bleed resistance of the resin composition.

S As described above, the resin composition includes the resin component including the ethylene-(meth)acrylate copolymer and at least either the ethylene-propylene-diene terpolymer or the ethylene acrylate rubber. The content of the ethylene-(meth)acrylate copolymer with respect to the total content of the ethylene-(meth)acrylate copolymer and at least either the ethylene-propylene-diene terpolymer or the ethylene acrylate rubber is 35% by mass or greater and 90% by mass or less. The tensile stress at 19% strain of the resin composition is 2.0 MPa or less, and the tensile stress at break is 10.3 MPa or greater. The resin composition as described above can ensure the flexibility, the strength, and the heat resistance sufficient to be used for the cover layer of the cable.

[Sheath Cable]

The FIGURE is a cross-sectional view showing an example of the sheath cable 10 according to the present embodiment. As illustrated in the FIGURE, the sheath cable 10 according to the present embodiment includes a conductor 11 and a cover layer 12 that covers the conductor 11 and includes the resin composition according to the embodiment described above. The resin composition according to the present embodiment has the sufficient flexibility, strength, and heat resistance. The sheath cable 10 including the cover layer 12 is suitable for the use in automobiles, for example.

The conductor 11 may be composed of a single wire, or may be a stranded wire including a plurality of wires bundled together. The conductor 11 may be composed of a single stranded wire, or may be a composite stranded wire including a plurality of the stranded wires bundled together. The conductor 11 preferably has a structure and a size prescribed in at least either JASO D624 or ISO 6722-1.

A diameter of the conductor 11 is preferably, but not necessarily, set to 4.0 mm or greater, and more preferably 5.0 mm or greater. Setting the diameter of the conductor 11 to this size can reduce the resistance of the conductor 11, and shorten the charging time when the battery has a large capacity, for example. The diameter of the conductor 11 is preferably, but not necessarily, set to 25 mm or smaller, and more preferably 20 mm or smaller. Setting the diameter of the conductor 11 to this size can facilitate the routing of the sheath cable 10 in a narrow and short path.

A diameter of the wire is preferably, but not necessarily, set to 0.1 mm or greater, and more preferably 0.2 mm or greater. Setting the diameter of the wire to this size can avoid the cutoff of the wire. The diameter of the wire is preferably, but not necessarily, set to 0.5 mm or smaller, and more preferably 0.4 mm or smaller. Setting the diameter of the wire to this size can facilitate the routing of the sheath cable 10 in a narrow and short path.

The material used for the conductor 11 is preferably, but not necessarily, at least one conductive metallic material selected from the group consisting of copper, a copper alloy, aluminum, and an aluminum alloy, for example.

A thickness of the cover layer 12 is preferably, but not necessarily, set to 0.5 mm or greater, and more preferably 0.65 mm or greater. Setting the thickness of the cover layer 12 to this size can effectively protect the conductor 11. The thickness of the cover layer 12 is preferably, but not necessarily, set to 2.0 mm or less, and more preferably 1.85 mm or less. Setting the thickness of the cover layer 12 to this size can facilitate the routing of the sheath cable 10 in a narrow and short path.

The sheath cable 10 may further include a shield layer covering the cover layer 12, and a sheath layer further covering the shield layer. The shield layer can prevent unnecessary electromagnetic waves from being emitted from the conductor 11. The shield layer can be formed such that a conductive metal foil, a metal-containing foil, or a metal wire (a metal conductor) is knitted in a mesh state. The sheath layer can effectively protect and bundle the shield layer. The sheath layer used herein may be, but not necessarily, olefin resin such as polyethylene, or the resin composition according to the embodiment.

The conductor 11 may be covered with the cover layer 12 by a known method. For example, the cover layer 12 may be formed by a typical extrusion molding method. An extruder used for the extrusion molding method may be a single screw extruder or a twin screw extruder, which has a screw, a breaker plate, a crosshead, a distributor, a nipple, and a die.

The resin composition used for the cover layer 12, when manufactured, is put into the extruder set at a temperature sufficient to melt the resin. At the same time, the other components such as the flame retardant, the antioxidant, and the processing auxiliary agent are also put into the extruder as necessary. The resin composition is melted and kneaded by the screw, and a predetermined amount is supplied to the crosshead via the breaker plate. The molten resin composition then flows into the circumference of the nipple by the distributor, and is extruded by the die in a state of covering the outer circumference of the conductor 11, so as to obtain the cover layer 12 covering the outer circumference of the conductor 11.

The sheath cable 10 according to the present embodiment thus can be provided with the cover layer 12 by the extrusion molding in the manner similar to a typical resin composition for cables. To improve the strength of the cover layer 12, the resin composition may be cross-linked by the method as described above such as radiation after the cover layer 12 is formed on the outer circumference of the conductor 11.

[Wire Harness]

A wire harness according to the present embodiment includes the sheath cable 10. The resin composition according to the embodiment described above has the sufficient flexibility, strength, and heat resistance. The sheath cable 10 including the cover layer 12 including the resin composition as described above can be suitably used for a wire harness for automobiles, for example.

EXAMPLES

The present embodiment is described in more detail below with reference to examples and comparative examples, but is not limited to these examples.

A pure copper conductor (stranded wire) having a cross-sectional area of 3.0 mm$^2$ was prepared as a metal conductor. The conductor was covered with a resin composition having a constitution (unit: part by mass) as indicated in Tables 1 to 4 to manufacture a sheath cable. The conductor was covered under the temperature condition of about 140° C. to 180° C. with an extrusion covering device for cable manufacture having a screw diameter of 40 mm. The temperature of melt-kneading for the resin composition and the temperature of the resin immediately after being removed from the extrusion covering device was about 140° C. The extrusion covering device was controlled so that the thickness of the cover layer after being covered was 0.65 mm as a standard. The sheath cable was cross-linked under the condition of 750 kV×160 kGy.

(Resin Component)
(1) Ethylene-Ethyl Acrylate Copolymer (EEA)
Ethyl acrylate (EA) content: 20% by mass
DPDJ-9169 manufactured by NUC Corporation
(2) Ethylene-Ethyl Acrylate Copolymer (EEA)
Ethyl acrylate (EA) content: 25% by mass
NUC-6570 manufactured by NUC Corporation
(3) Ethylene-Ethyl Acrylate Copolymer (EEA)
Ethyl acrylate (EA) content: 30% by mass
EX4227 manufactured by Ube-Maruzen Polyethylene Co, Ltd.
(4) Ethylene-Methyl Acrylate Copolymer (EMA)
Methyl acrylate (MA) content: 20% by mass
Elvaloi (registered trademark) AC 1820 manufactured by Du Pont-Mitsui Polychemicals Co., Ltd.
(5) Ethylene-Methyl Acrylate Copolymer (EMA)
Methyl acrylate (MA) content: 25% by mass
Elvaloi (registered trademark) AC 1125 manufactured by Du Pont-Mitsui Polychemicals Co., Ltd.
(6) Ethylene-Methyl Acrylate Copolymer (EMA)
Methyl acrylate (MA) content: 29% by mass
LOTRYL (registered trademark) 29MA03 manufactured by Arkema Inc.
(7) Ethylene-Methyl Acrylate Copolymer (EMA)
Methyl acrylate (MA) content: 29% by mass
LOTRYL (registered trademark) 29MA03T manufactured by Arkema Inc.
(8) Ethylene-Propylene-Diene Terpolymer (EPDM)
NORDEL (registered trademark) IP4760P manufactured by The Dow Company
(9) Ethylene Acrylate Rubber (AEM)
Vamac (registered trademark) VMX2122 manufactured by Du Pont Co.

The resin component 29MA03 was polymerized by autoclave polymerization, and the resin component 29MA03T was polymerized by tubular polymerization. The resin component 29MA03 had a number average molecular weight Mn of 15,555, and had a weight average molecular weight Mw of 108,163. A ratio Mw/Mn was 6.954. The resin component 29MA03T had a number average molecular weight Mn of 18,199, and had a weight average molecular weight Mw of 70,533. A ratio Mw/Mn was 3.876.

(Flame Retardant)
(1) Brominated Flame Retardant
Ethylene bis(pentabromophenyl): 30 parts by mass
SAYTEX (registered trademark) 8010 manufactured by Albemarle Corporation
(2) Antimony Flame Retardant
Antimony trioxide: 10 parts by mass
PATOX (registered trademark) M manufactured by Nippon Seiko Co., Ltd.

The content of the brominated flame retardant was set to 75% by mass, and the content of the antimony flame retardant was set to 25% by mass, with respect to the entire flame retardant. The ratio of the brominated flame retardant to the antimony flame retardant (the brominated flame retardant/the antimony flame retardant) was prepared to three.

(Antioxidant)
(1) ADK STAB (registered trademark) AO-20 manufactured by ADEKA CORPORATION: 12 parts by mass
(2) ADK STAB (registered trademark) AO-412S manufactured by ADEKA CORPORATION: 12 parts by mass (Processing Auxiliary Agent)
Trimethylolpropane trimethacrylate (TMPT) manufactured by Shin-Nakamura Chemical Co., Ltd.

[Evaluation]

The respective examples and comparative examples were evaluated by the following method. The evaluation results are shown in the respective tables.

(Hardness)

The conductor was removed from the sheath cable after being subjected to the cross-linking treatment to obtain the cover layer. A resin sheet obtained such that the resin composition included in the cover layer was press-molded to have a thickness of 6 mm was measured with the type A durometer in accordance with JIS K7215:1986. The resin sheet with the hardness of 75 or less was graded as B (passed), and the resin sheet with the hardness of greater than 75 was graded C (failed).

(Tensile Stress at 19% Strain)

The conductor was removed from the sheath cable after being subjected to the cross-linking treatment to obtain the cover layer. The tensile stress at 19% strain of the resin composition included in the cover layer was measured in accordance with JIS K7161-1:2014 so as to evaluate the flexibility. A test sample was prepared such that the resin composition was formed into a resin sheet having a thickness of 1 mm, and was then punched into a dumbbell shape, No. 3, prescribed in JIS K6251:2017 (Rubber, vulcanized or thermoplastic-Determination of tensile stress-strain properties). The tensile stress at 19% strain was measured at a room temperature (23° C.) at a test speed of 200 mm/min. The test sample with the tensile stress at 19% strain of 1.5 MPa or less was graded A (good), the test sample with the tensile stress at 19% strain of greater than 1.5 MPa and 2.0 MPa or less was graded B (passed), and the test sample with the tensile stress at 19% strain of greater than 2.0 MPa was graded C (failed).

(Tensile Stress at Break)

The conductor was removed from the sheath cable after being subjected to the cross-linking treatment to obtain the cover layer. The tensile stress at break of the resin composition included in the cover layer was measured in accordance with JIS K7161-1:2014 so as to evaluate the flexibility. A test sample was prepared such that the resin composition was formed into a resin sheet having a thickness of 1 mm, and was then punched into a dumbbell shape, No. 3, prescribed in JIS K6251:2017 (Rubber, vulcanized or thermoplastic-Determination of tensile stress-strain properties). The tensile stress at break was measured at a room temperature (23° C.) at a test speed of 200 mm/min. The test sample with the tensile stress at break of 10.3 MPa or greater was graded B (passed), and the test sample with the tensile stress at break of less than 10.3 MPa was graded C (failed). The tensile stress at break of the ethylene-(meth)acrylate copolymer was also independently measured by the same method as described above. The case with the tensile stress at break of 9 MPa or greater was graded B (passed), and the case with the tensile stress at break of less than 9 MPa was graded C (failed).

(Heat Resistance)

The heat resistance of the resin composition after being subjected to the cross-linking treatment was measured in accordance with JASO D624. In particular, an elongated rate of the test sample when heated for a predetermined period of time was substituted in the Arrhenius equation, and a temperature was estimated at which the elongated rate of the test sample when heated for 10,000 hours was 100%. The test sample was prepared such that the resin composition was formed into a resin sheet having a thickness of 1 mm, and was then punched into a dumbbell shape. No. 3, prescribed in JIS K6251:2017. The test sample used for the measurement was heated up to 5,000 hours under the heating condition of 160° C. to 190° C. in accordance with JIS K7212:1999 (Plastics-Determination of thermal stability of thermoplastics-Oven method). The test sample was then removed from the oven and left at a room temperature (23° C.) for 12 hours. The elongated rate was measured at a room temperature (23° C.) at a test speed of 200 mm/min. The test sample was graded B (passed) when the temperature at which the elongated rate was 100% was 150° C. or higher, and the test sample was graded C (failed) when the temperature was lower than 150° C.

(Flexural Modulus)

A test piece was prepared such that the ethylene-(meth)acrylate copolymer was press-molded and punched into the dimensions prescribed in JIS K7171 (ISO 178) to have a thickness of 4.0 mm. The test piece punched was then compressed at a room temperature (23° C.) at a test speed of 2.0 mm/min, and the flexural modulus (the flexural modulus of elasticity) was calculated according to a calculation method prescribed in item 3.11 of JIS K7171. The test piece with the flexural modulus of 15 MPa or less was graded B (passed), and the test piece with the flexural modulus of greater than 15 MPa was graded C (failed).

TABLE 1

|  |  |  | Tensile stress at break | Flexural modulus | Example 1 | Example 2 | Example 3 | Example 4 | Example 5 |
|---|---|---|---|---|---|---|---|---|---|
| Resin composition | EEA(EA content 20%) | DPD1-9169 | B | C | — | — | — | — | — |
|  | EEA(EA content 25%) | NUC-6570 | B | C | 50 | — | — | — | — |
|  | EEA(EA content 30%) | EX4227 | C | B | — | — | — | — | — |
|  | EMA(MA content 20%) | AC1820 | B | C | — | — | — | — | — |
|  | EMA(MA content 25%) | AC1125 | B | C | — | 50 | — | — | — |
|  | EMA(MA content 29%) | 29MA03 | C | B | — | — | 80 | 80 | — |
|  | EMA(MA content 29%) | 29MA03T | B | B | — | — | — | — | 80 |
|  | EPDM | IP4760P | — | — | 50 | 50 | 20 | — | 20 |
|  | AEM | VMX2122 | — | — | — | — | — | 20 | — |
|  | Flame retardant |  | — | — | 40 | 40 | 40 | 40 | 40 |
|  | Antioxidant |  | — | — | 24 | 24 | 24 | 24 | 24 |
|  | Processing auxiliary agent |  | — | — | 1 | 1 | 1 | 1 | 1 |

TABLE 1-continued

| Evaluation | | | Hardness | | B | B | B | B | B |
|---|---|---|---|---|---|---|---|---|---|
| | | | Tensile stress at 19% strain | | B | B | B | B | B |
| | | | Tensile stress at break | | B | B | B | B | B |
| | | | Heat resistance | | B | B | B | B | B |

| | | | Tensile stress at break | Flexural modulus | Example 6 | Example 7 | Example 8 | Example 9 | Example 10 |
|---|---|---|---|---|---|---|---|---|---|
| Resin composition | EEA(EA content 20%) | DPD1-9169 | B | C | — | — | — | — | — |
| | EEA(EA content 25%) | NUC-6570 | B | C | — | — | — | — | — |
| | EEA(EA content 30%) | EX4227 | C | B | — | — | — | — | — |
| | EMA(MA content 20%) | AC1820 | B | C | — | — | — | — | — |
| | EMA(MA content 25%) | AC1125 | B | C | — | — | — | — | — |
| | EMA(MA content 29%) | 29MA03 | C | B | — | — | — | — | — |
| | EMA(MA content 29%) | 29MA03T | B | B | 70 | 40 | 80 | 70 | 40 |
| | EPDM | IP4760P | — | — | 30 | 60 | — | — | — |
| | AEM | VMX2122 | — | — | — | — | 20 | 30 | 60 |
| | Flame retardant | | — | — | 40 | 40 | 40 | 40 | 40 |
| | Antioxidant | | — | — | 24 | 24 | 24 | 24 | 24 |
| | Processing auxiliary agent | | — | — | 1 | 1 | 1 | 1 | 1 |
| Evaluation | | | Hardness | | B | B | B | B | B |
| | | | Tensile stress at 19% strain | | A | A | B | A | A |
| | | | Tensile stress at break | | B | B | B | B | B |
| | | | Heat resistance | | B | B | B | B | B |

TABLE 2

| | | | Tensile stress at break | Flexural modulus | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Resin composition | EEA(EA content 20%) | DPDJ-9169 | B | C | 100 | — | — | — | — | — | — |
| | EEA(EA content 25%) | NUC-6570 | B | C | — | 100 | — | — | — | — | — |
| | EEA(EA content 30%) | EX4227 | C | B | — | — | 100 | — | — | — | — |
| | EMA(MA content 20%) | AC1820 | B | C | — | — | — | 100 | — | — | — |
| | EMA(MA content 25%) | AC1125 | B | C | — | — | — | — | 100 | — | — |
| | EMA(MA content 29%) | 29MA03 | C | B | — | — | — | — | — | 100 | — |
| | EMA(MA content 29%) | 29MA03T | B | B | — | — | — | — | — | — | 100 |
| | EPDM | IP4760P | — | — | — | — | — | — | — | — | — |
| | AEM | VMX2122 | — | — | — | — | — | — | — | — | — |
| | Flame retardant | | — | — | 40 | 40 | 40 | 40 | 40 | 40 | 40 |
| | Antioxidant | | — | — | 24 | 24 | 24 | 24 | 24 | 24 | 24 |
| | Processing auxiliary agent | | — | — | 1 | 1 | 1 | 1 | 1 | 1 | 1 |
| Evaluation | | | Hardness | | C | C | B | C | C | C | C |
| | | | Tensile stress at 19% strain | | C | C | B | C | C | C | C |
| | | | Tensile stress at break | | B | B | C | B | B | B | B |
| | | | Heat resistance | | B | B | B | B | B | B | B |

TABLE 3

| | | | Tensile stress at break | Flexural modulus | Comparative Example 8 | Comparative Example 9 | Comparative Example 10 | Comparative Example 11 |
|---|---|---|---|---|---|---|---|---|
| Resin composition | EEA(EA content 20%) | DPDJ-9169 | B | C | 40 | 30 | — | — |
| | EEA(EA content 25%) | NUC-6570 | B | C | — | — | — | — |
| | EEA(EA content 30%) | EX4227 | C | B | — | — | — | — |
| | EMA(MA content 20%) | AC1820 | B | C | — | — | 40 | 30 |
| | EMA(MA content 25%) | AC1125 | B | C | — | — | — | — |
| | EMA(MA content 29%) | 29MA03 | C | B | — | — | — | — |
| | EMA(MA content 29%) | 29MA03T | B | B | — | — | — | — |
| | EPDM | IP4760P | — | — | 60 | 70 | 60 | 70 |
| | AEM | VMX2122 | — | — | — | — | — | — |
| | Flame retardant | | — | — | 40 | 40 | 40 | 40 |
| | Antioxidant | | — | — | 24 | 24 | 24 | 24 |
| | Processing auxiliary agent | | — | — | 1 | 1 | 1 | 1 |
| Evaluation | | | Hardness | | C | B | C | B |
| | | | Tensile stress at 19% strain | | C | B | C | B |
| | | | Tensile stress at break | | B | C | B | C |
| | | | Heat resistance | | B | C | B | C |

TABLE 3-continued

| | | | Tensile stress at break | Flexural modulus | Comparative Example 12 | Comparative Example 13 | Comparative Example 14 | Comparative Example 15 |
|---|---|---|---|---|---|---|---|---|
| Resin composition | EEA(EA content 20%) | DPDJ-9169 | B | C | — | — | — | — |
| | EEA(EA content 25%) | NUC-6570 | B | C | 70 | 30 | — | — |
| | EEA(EA content 30%) | EX4227 | C | B | — | — | — | — |
| | EMA(MA content 20%) | AC1820 | B | C | — | — | — | — |
| | EMA(MA content 25%) | AC1125 | B | C | — | — | 70 | 30 |
| | EMA(MA content 29%) | 29MA03 | C | B | — | — | — | — |
| | EMA(MA content 29%) | 29MA03T | B | B | — | — | — | — |
| | EPDM | IP4760P | — | — | 30 | 70 | 30 | 70 |
| | AEM | VMX2I22 | — | — | — | — | — | — |
| | Flame retardant | | — | — | 40 | 40 | 40 | 40 |
| | Antioxidant | | — | — | 24 | 24 | 24 | 24 |
| | Processing auxiliary agent | | — | — | 1 | 1 | 1 | 1 |
| Evaluation | Hardness | | | | C | B | C | B |
| | Tensile stress at 19% strain | | | | C | A | C | A |
| | Tensile stress at break | | | | B | B | B | B |
| | Heat resistance | | | | B | C | B | C |

TABLE 4

| | | | Tensile stress at break | Flexural modulus | Comparative Example 16 | Comparative Example 17 | Comparative Example 18 | Comparative Example 19 |
|---|---|---|---|---|---|---|---|---|
| Resin composition | EEA(EA content 20%) | DPDJ-9169 | B | C | — | — | — | — |
| | EEA(EA content 25%) | NUC-6570 | B | C | — | — | — | — |
| | EEA(EA content 30%) | EX4227 | C | B | — | — | — | — |
| | EMA(MA content 20%) | AC1820 | B | C | — | — | — | — |
| | EMA(MA content 25%) | AC1125 | B | C | — | — | — | — |
| | EMA(MA content 29%) | 29MA03 | C | B | 90 | 70 | 90 | 70 |
| | EMA(MA content 29%) | 29MA03T | B | B | — | — | — | — |
| | EPDM | IP4760P | — | — | 10 | 30 | — | — |
| | AEM | VMX2122 | — | — | — | — | 10 | 30 |
| | Flame retardant | | — | — | 40 | 40 | 40 | 40 |
| | Antioxidant | | — | — | 24 | 24 | 24 | 24 |
| | Processing auxiliary agent | | — | — | 1 | 1 | 1 | 1 |
| Evaluation | Hardness | | | | C | B | C | B |
| | Tensile stress at 19% strain | | | | C | A | C | A |
| | Tensile stress at break | | | | B | C | B | C |
| | Heat resistance | | | | B | B | B | B |

| | | | Tensile stress at break | Flexural modulus | Comparative Example 20 | Comparative Example 21 | Comparative Example 22 | Comparative Example 23 |
|---|---|---|---|---|---|---|---|---|
| Resin composition | EEA(EA content 20%) | DPDJ-9169 | B | C | — | — | — | — |
| | EEA(EA content 25%) | NUC-6570 | B | C | — | — | — | — |
| | EEA(EA content 30%) | EX4227 | C | B | — | — | — | — |
| | EMA(MA content 20%) | AC1820 | B | C | — | — | — | — |
| | EMA(MA content 25%) | AC1125 | B | C | — | — | — | — |
| | EMA(MA content 29%) | 29MA03 | C | B | — | — | — | — |
| | EMA(MA content 29%) | 29MA03T | B | B | 90 | 30 | 90 | 30 |
| | EPDM | IP4760P | — | — | 10 | 70 | — | — |
| | AEM | VMX2122 | — | — | — | — | 10 | 70 |
| | Flame retardant | | — | — | 40 | 40 | 40 | 40 |
| | Antioxidant | | — | — | 24 | 24 | 24 | 24 |
| | Processing auxiliary agent | | — | — | 1 | 1 | 1 | 1 |
| Evaluation | Hardness | | | | C | B | C | B |
| | Tensile stress at 19% strain | | | | C | A | C | A |
| | Tensile stress at break | | | | B | C | B | C |
| | Heat resistance | | | | B | C | B | C |

As shown in Table 1, the resin compositions of Example 1 to Example 10 exhibited the high tensile stress at 19% strain, the high tensile stress at break, and the high heat resistance. According to the respective results, the resin compositions of Example 1 to Example 10 can be presumed to have the flexibility, the strength, and the heat resistance sufficient to be used for the cover layer of the cable. As shown in Table 2 to Table 4, the resin compositions of Comparative Example 1 to Comparative Example 23 each had the result in which at least one of the flexibility, the strength, and the heat resistance was not satisfactory. The test results revealed that preparing the resin compositions composed with the particular components and the particular compositions can lead to the flexibility, the strength, and the heat resistance sufficient to be used for the cover layer of the cable. The evaluation results of Example 5 to Example 10 shown in Table 1 also revealed that the ethylene-(meth) acrylate copolymer, when obtained by the tubular polymerization, could exhibit the good effects with the content in the wide range of 40 parts by mass to 80 parts by mass. The ethylene-(meth)acrylate copolymer, when having the content in the range of 40 parts by mass to 70 parts by mass, could exhibit the better effects regarding the tensile stress at 19% strain.

It should be understood that the present embodiment described above is not intended to be limited to these descriptions, and various modifications can be made within the scope of the present embodiment.

What is claimed is:

1. A resin composition comprising a resin component including an ethylene-(meth)acrylate copolymer and at least either an ethylene-propylene-diene terpolymer or ethylene acrylate rubber,
    wherein a content of the ethylene-(meth)acrylate copolymer with respect to a total content of the ethylene-(meth)acrylate copolymer and at least either the ethylene-propylene-diene terpolymer or the ethylene acrylate rubber is 35% by mass or greater and 90% by mass or less,
    a tensile stress at 19% strain of the resin composition is 2.0 MPa or less,
    a tensile stress at break of the resin composition is 10.3 MPa or greater, and
    a tensile stress at break of the ethylene-(meth)acrylate copolymer is 9 MPa or greater, and a flexural modulus of the ethylene-(meth)acrylate copolymer is 15 MPa or less.

2. The resin composition according to claim 1, wherein a content of (meth)acrylate included in the ethylene-(meth)acrylate copolymer is 24% by mass or greater.

3. The resin composition according to claim 1, further comprising a flame retardant of 80 parts by mass or less with respect to 100 parts by mass of the resin component.

4. The resin composition according to claim 1, having heat resistance of 150° C. prescribed in JASO D624.

5. The resin composition according to claim 1, wherein the content of the ethylene-(meth)acrylate copolymer with respect to the total content of the ethylene-(meth)acrylate copolymer and at least either the ethylene-propylene-diene terpolymer or the ethylene acrylate rubber is 40% by mass or greater and 80% by mass or less.

6. The resin composition according to claim 1, wherein a ratio of a weight average molecular weight to a number average molecular weight of the ethylene-(meth)acrylate copolymer is five or smaller.

7. The resin composition according to claim 1, wherein a content of (meth)acrylate included in the ethylene-(meth)acrylate copolymer is 28% by mass or greater and less than 30% by mass, the content of the ethylene-(meth)acrylate copolymer with respect to the total content of the ethylene-(meth)acrylate copolymer and at least either the ethylene-propylene-diene terpolymer or the ethylene acrylate rubber is 35% by mass or greater and 80% by mass or less, and a ratio of a weight average molecular weight to a number average molecular weight of the ethylene-(meth)acrylate copolymer is one or greater and five or less.

8. A sheath cable comprising:
    a conductor; and
    a cover layer covering the conductor and including the resin composition according to claim 1.

9. A wire harness comprising the sheath cable according to claim 8.

10. A resin composition comprising a resin component including an ethylene-(meth)acrylate copolymer and at least either an ethylene-propylene-diene terpolymer or ethylene acrylate rubber,
    wherein a content of the ethylene-(meth)acrylate copolymer with respect to a total content of the ethylene-(meth)acrylate copolymer and at least either the ethylene-propylene-diene terpolymer or the ethylene acrylate rubber is 35% by mass or greater and 90% by mass or less,
    a tensile stress at 19% strain of the resin composition is 2.0 MPa or less,
    a tensile stress at break of the resin composition is 10.3 MPa or greater, and
    a ratio of a weight average molecular weight to a number average molecular weight of the ethylene-(meth)acrylate copolymer is five or smaller.

11. A resin composition comprising a resin component including an ethylene-(meth)acrylate copolymer and at least either an ethylene-propylene-diene terpolymer or ethylene acrylate rubber,
    a tensile stress at 19% strain of the resin composition is 2.0 MPa or less,
    a tensile stress at break of the resin composition is 10.3 MPa or greater, and
    a content of (meth)acrylate included in the ethylene-(meth)acrylate copolymer is 28% by mass or greater and less than 30% by mass, a content of the ethylene-(meth)acrylate copolymer with respect to a total content of the ethylene-(meth)acrylate copolymer and at least either the ethylene-propylene-diene terpolymer or the ethylene acrylate rubber is 35% by mass or greater and 80% by mass or less, and a ratio of a weight average molecular weight to a number average molecular weight of the ethylene-(meth)acrylate copolymer is one or greater and five or less.

* * * * *